United States Patent
Lin et al.

(10) Patent No.: US 11,814,290 B2
(45) Date of Patent: Nov. 14, 2023

(54) PROCESSES FOR PRODUCTION OF CARBON NANOTUBES FROM NATURAL RUBBER

(71) Applicant: Agency for Science, Technology and Research, Singapore (SG)

(72) Inventors: Ming Lin, Singapore (SG); Yuanting Karen Tang, Singapore (SG); Hui Teng Casandra Chai, Singapore (SG); Ziyi Zhong, Singapore (SG); Ji Zhong Luo, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 638 days.

(21) Appl. No.: 16/651,107

(22) PCT Filed: Sep. 27, 2018

(86) PCT No.: PCT/SG2018/050491
§ 371 (c)(1),
(2) Date: Mar. 26, 2020

(87) PCT Pub. No.: WO2019/066727
PCT Pub. Date: Apr. 4, 2019

(65) Prior Publication Data
US 2020/0223696 A1    Jul. 16, 2020

(30) Foreign Application Priority Data
Sep. 27, 2017    (SG) .............................. 10201707943S

(51) Int. Cl.
*C01B 32/162*    (2017.01)
*C01B 32/168*    (2017.01)
(Continued)

(52) U.S. Cl.
CPC ........... *C01B 32/162* (2017.08); *B01J 23/005* (2013.01); *B01J 23/755* (2013.01);
(Continued)

(58) Field of Classification Search
None
See application file for complete search history.

(56) References Cited

U.S. PATENT DOCUMENTS

| 2003/0004058 A1 | 1/2003 | Li et al. |
| 2009/0278114 A1 | 11/2009 | Grill et al. |

(Continued)

FOREIGN PATENT DOCUMENTS

| CN | 1830767 A | 9/2006 |
| CN | 102491308 A | 6/2012 |
| WO | 2014202740 A1 | 12/2014 |

OTHER PUBLICATIONS

Machine translation of Zhuo, CN 102491308 A (Year: 2012).*
(Continued)

*Primary Examiner* — Coris Fung
*Assistant Examiner* — Keling Zhang
(74) *Attorney, Agent, or Firm* — Shackelford, Bowen, McKinley & Norton, LLP

(57) ABSTRACT

A method for the synthesis of carbon nanotubes from natural rubber, including providing a first material, the first material may include natural rubber or derivatives thereof, thermally decomposing the first material at a first temperature into an intermediate material, contacting the intermediate material with a catalyst, treating the intermediate material in contact with the catalyst at a second temperature, for forming carbon nanotubes. Adjusting an average characteristic of resulting nanotubes, including carrying out the synthesis method as a reference method and for decreasing the average diameter of the nanotube: decreasing the second temperature and/or
(Continued)

decreasing the reaction time and/or increasing the concentration of $H_2$ in the forming gas in relation to the reference method. Or, for increasing the average diameter of the nanotube: increasing the second temperature and/or increasing the reaction time and/or decreasing the concentration of $H_2$ in the forming gas in relation to the reference method.

18 Claims, 10 Drawing Sheets

(51) Int. Cl.
  B01J 23/00    (2006.01)
  B01J 23/755   (2006.01)
  B01J 37/02    (2006.01)
  B01J 37/03    (2006.01)
  B01J 37/04    (2006.01)
  B01J 37/08    (2006.01)
  B01J 37/18    (2006.01)
(52) U.S. Cl.
  CPC ......... *B01J 37/0236* (2013.01); *B01J 37/036* (2013.01); *B01J 37/04* (2013.01); *B01J 37/088* (2013.01); *B01J 37/18* (2013.01); *C01B 32/168* (2017.08); *C01B 2202/06* (2013.01); *C01B 2202/36* (2013.01); *C01P 2002/72* (2013.01); *C01P 2002/88* (2013.01); *C01P 2004/04* (2013.01)

(56) References Cited

U.S. PATENT DOCUMENTS

| 2014/0011007 | A1 | 1/2014 | Raney et al. |
| 2016/0002033 | A1 | 1/2016 | Noda et al. |

OTHER PUBLICATIONS

Takahashi et al., Ni/SiO2 prepared by sol-gel process using citric acid, Microporous and Mesoporous Materials, 197-208, 2003 (Year: 2003).*
Yang et al., Effects of nickel species on Ni/Al2O3 catalysts in carbon nanotube and hydrogen production by waste plastic gasification: Bench- and Pilot-Scale Tests, 2015, 8178-8187 (Year: 2015).*
Akask et al., Carbon nanotube diameter tuning using hydrogen amount and temperature on SiO2/Si substrate, App. Phys. A, 213-222, 2010 (Year: 2010).*
Zhang et al., "Pyrolysis-Catalytic Reforming/Gasification of Waste Tires for Production of Carbon Nanotubes and Hydrogen," Energy & Fuels, vol. 29, 2015, pp. 3328-3334.
Wu et al., "Production and Application of Carbon Nanotubes, as a Co-Product of Hydrogen from the Pyrolysis-Catalytic Reforming of Waste Plastic," Process Safety and Environmental Protection, vol. 103, 2016, pp. 107-114.
Yang et al., "Effects of Nickel Species on Ni/Al2O3 Catalysts in Carbon Nanotube and Hydrogen Production by Waste Plastic Gasification: Bench- and Pilot-Scale Tests," Energy & Fuels, vol. 29, 2015, pp. 8178-8187.
Essawy et al., "Fabrication of Single-Walled Carbon Nanotubes From Vulcanized Scrap Rubber via Thermal Chemical Vapor Deposition," RSC Advances, vol. 7, 2017, pp. 12938-12944.
Eslami et al., "Sol-Gel Sythesis and Characterization of Ni/Al2O3 Nanocatalysts Doped with Co and Cu," AIP Conference Proceedings, 1315, 2011, pp. 1297-1302.
Zhang et al., "Carbon Nanotubes and Hydrogen Production from the Pyrolysis Catalysis or Catalytic-Steam Reforming of Waste Tyres," Journal of Analytical and Applied Pyrolysis, vol. 122, 2016, pp. 490-501.
Wu et al., "Procesing Real-World Waste Plastics by Pyrolysis-Reforming for Hydrogen and High-Value Carbon Nanotubes," Environmental Science & Technology, vol. 48, 2013, pp. 819-826.
Wu et al., "Sustainable Processing of Waste Plastics to Produce High Yield Hydrogen-Rich Synthesis Gas and High Quality Carbon Nanotubes," RSC Advances, vol. 2, 2012, pp. 4045-4047.
Wu et al., "Hydrogen Production by Steam Gasification of Polypropylene with Various Nickel Catalysts," Applied Catalysis B: Environmental, vol. 87, 2009, pp. 152-161.
Acomb et al., "The Use of Different Metal Catalysts for the Simultaneous Production of Carbon Nanotubes and Hydrogen from Pyrolysis of Plastic Feedstocks," Applied Catalysis B: Environmental, vol. 180, 2016, pp. 497-510.
Yan et al., "Carbon Nanotube Catalysts: Recent Advances in Synthesis, Characterization and Applications," Chem. Soc. Rev., vol. 44, 2015, pp. 3295-3346.
Mirershadi et al., "Effective Condition for Purification of Multi-Walled Carbon Nanotubes by Nitric Acid," Synthesis and Reactivity in Inorganic, Metal-Organic, and Nano-Metal Chemistry, vol. 39, 2009, pp. 312-316.
Zhang et al., "High-Value Resource Recovery Products from Waste Tyres," Proceedings of the Institution of Civil Engineers, vol. 169, No. WR3, Apr. 22, 2016, pp. 137-145.
International Search Report for International Application No. PCT/SG2018/050491 dated Nov. 5, 2018, pp. 1-4.
Written Opinion of the International Searching Authority for International Application No. PCT/SG2018/050491 dated Nov. 5, 2018, pp. 1-6.

\* cited by examiner

PROCESSES FOR PRODUCTION OF CARBON NANOTUBES FROM NATURAL RUBBER

CROSS-REFERENCE TO RELATED APPLICATION

This application claims the benefit of priority of Singapore application No. 102017079435 filed on Sep. 27, 2017, the contents of it being hereby incorporated by reference in its entirety for all purposes.

TECHNICAL FIELD

Various aspects of this disclosure may relate to a method for the synthesis of carbon nanotubes from natural rubber. Various aspects of this disclosure may relate to an adjusting method for adjusting the average characteristic of the resulting nanotubes produced by the synthesis method.

BACKGROUND

One-dimensional carbon nanomaterials have important industrial applications due to their unique mechanical and physical properties. For example, carbon nanofibers are widely used in aerospace, high-end sports and industrial products. Carbon nanotubes (CNTs) are another type of one-dimensional carbon nanomaterials, which are stronger, lighter, and more conductive than carbon nanofibers. CNTs have wider applications as transparent electrodes which are essential components of organic solar cells, as Li-ion battery electrodes, supercapacitors, field effect transistors, and catalysts, etc. The global market for various CNT grades was $192 million in 2011. It was estimated $527 million in revenues by 2016. In 2016, the production output in China was about 3000 metric tons. Currently, the conventional way for the synthesis of CNTs is from the thermal decomposition of fossil fuels, mostly gaseous hydrocarbons ($CH_4$, $C_2H_4$, $C_2H_2$ etc), on active metal catalysts. However the synthesis of CNT using fossil fuels is not sustainable as it depends on a limited resource.

SUMMARY

Various embodiments may provide a method for the synthesis of carbon nanotubes from natural rubber, hereinafter also referred to as synthesis method. The method may include providing a first material, the first material may include a natural rubber or derivatives thereof The method may further include thermally decomposing the first material at a first temperature into an intermediate material. The method may further include contacting the intermediate material with a catalyst. The method may further include thermally treating the intermediate material in contact with the catalyst at a second temperature, for forming carbon nanotubes.

Various embodiments may provide an adjusting method for adjusting an average characteristic of resulting nanotubes produced by the synthesis method. The adjusting method may include carrying out the synthesis method as a reference method and for decreasing the average diameter of the nanotube, the adjusting method may include decreasing the second temperature and/or decreasing the reaction time and/or increasing the concentration of $H_2$ in the forming gas in relation to the reference method. Alternatively, the adjusting method may include carrying out the synthesis method as a reference method and for increasing the average diameter of the nanotube, the adjusting method may include increasing the second temperature and/or increasing the reaction time and/or decreasing the concentration of $H_2$ in the forming gas in relation to the reference method.

BRIEF DESCRIPTION OF THE DRAWINGS

The invention will be better understood with reference to the detailed description when considered in conjunction with the non-limiting examples and the accompanying drawings, in which.

DETAILED DESCRIPTION

Figure 1:
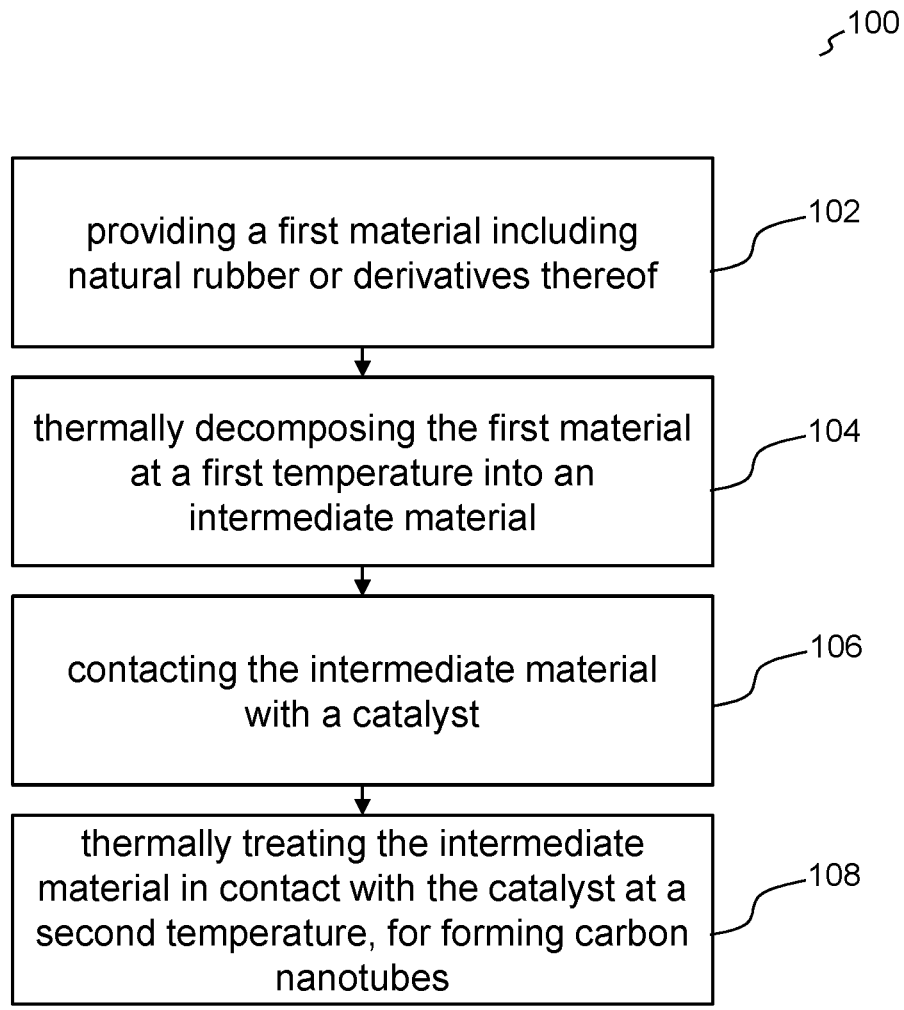
FIG. 1 shows a schematic illustrating a method 100 for the synthesis of carbon nanotubes according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

Various aspects of this disclosure may relate to a method for the synthesis of carbon nanotubes directly from solid natural rubber including the gel, e.g. sol-gel, or solution preparation of a catalyst (e.g. a transition metal catalyst) and the two-stage process for rubber decomposition and CNTs growth respectively. Natural rubber, or waste of natural rubber, may be used as carbon source to form CNTs.

As used herein and in accordance with various embodiments, the term "about" in relation to a given numerical value, such as for temperature and period of time, is meant to include numerical values within +1-10% of the specific given numerical value and to encompass the specific given numerical value.

As used herein and in accordance with various embodiments, the term "substantial" and its derivatives, is defined to be at least 10 weight %, preferably at least 30 weight %, further preferably at least 50 weight % of the total weight. For example "substantially include natural rubber" may mean that at least 10 weight %, preferably at least 30 weight %, further preferably at least 50 weight % of the total weight is natural rubber.

According to various embodiments, the first material may substantially include or may consist of the natural rubber or derivatives thereof. In various embodiments, natural rubber may refer to latex as obtained from plants, preferably trees, and from processing stages before sulfur is added. Thus, in accordance with various embodiments, the natural rubber may be obtained from the processing steps of natural rubber, between the collection of natural latex, e.g. from trees, and before sulfur is added, e.g. before a vulcanization step. For example, the latex may be coagulated latex. The natural rubber may also refer to natural rubber latex, preferably from *Hevea brasiliensis*. In various embodiments, the water concentration in natural rubber or derivatives thereof may be less than 1 weight %. In various embodiments, the first material may include less than 10 weight % of vulcanized rubber. In various embodiments, the water concentration of the first material may be less than 1 weight %. For example, a natural rubber containing material may be dried before being provided as the first material. The first material may be waste obtained from processing of natural rubber, or simply "natural rubber waste", may be, for example selected from: latex, coagulated latex. In one example, natural rubber or derivatives thereof may be selected from one or more of: latex, coagulated latex, natural rubber waste, recycled rubber (from natural rubber) treated to remove sulfur.

The main component of natural rubber is polyisoprene, together with small quantities of impurities, such as proteins, natural lipids, and inorganic compounds. Polyisoprene consists of long chains of repeating isoprene molecules. The molar mass of polyisoprene in rubber ranges from about 50,000 to about 3,0000,000 g/mol. Natural rubber can be distinguished from synthetic rubber, as synthetic rubber has higher decomposing temperatures.

According to various embodiments, the natural rubber derivative may be recycled rubber. The recycled rubber may be treated rubber so that sulfur is removed, for example, the method may include treating rubber for removing sulfur to reduce an amount of sulfur.

FIG. 1 shows a schematic illustrating a method 100 for the synthesis of carbon nanotubes according to various embodiments. In a step 102, the first material may be provided. The first material may include natural rubber or derivatives thereof. In a further step 104, the first material may be thermally decomposed, at a first temperature, into an intermediate material. The intermediate material may be volatile and may be transported by gas flow. In a further step 106, the intermediate material may be contacted with a catalyst and in a step 108, the intermediate material in contact with the catalyst may be thermally treated, at a second temperature, thereby forming carbon nanotubes. Steps 106 and 108 may be carried out simultaneously.

According to various embodiments, thermally decomposing the first material may be carried out in a first location. The first location may be in a first furnace, for example the first location may be a first section of the first furnace.

According to various embodiments, thermally decomposing the first material into the intermediate material is carried out at the first temperature. The first temperature may be selected from about 200° C. to about 500° C., for example from about 250° C. to about 450° C., and further for example from about 350° C. to about 420° C.

According to various embodiments, thermally treating the intermediate material may be carried out in a second location. The second location may be different from the first location. The second location may be selected from: a second furnace or a second section of the first furnace. For example, the first location may be a first section of the first furnace and the second location may be a second section of the first furnace.

According to various embodiments, the time during the thermal treatment of the intermediate material in contact with the catalyst may also be referred to as reaction time. For example, the reaction time may be last from about 10 minutes to about 2 hours, and further for example from about 10 min to about 50 minutes.

According to various embodiments, thermally treating the intermediate material may be carried out at the second temperature, for example in contact with a catalyst. The second temperature may be selected from about 600° C. to about 800° C., for example from about 650° C. to about 800° C.

According to various embodiments, at least one of (i) thermally decomposing the first material and (ii) thermally treating the intermediate material, is carried out under a forming gas. The forming gas may be provided as a gas flow. The forming gas may be an inert gas, for example nitrogen ($N_2$) or argon.

The term 'inert gas' is to be interpreted broadly to include any gas which does not form chemical bonds when used in chemical vapor deposition. Exemplary inert gases include noble gases but may include other gases so long as no chemical bonds are formed.

According to various embodiments, the flow may be from the first location to the second location, and the intermediate material may be carried by the flow from the first location to the second location. For example, the forming gas may transport the intermediate material from the first location to the second location, and thereby, after the first material is decomposed, the intermediate material may be thermally treated in the second location. The thermal decomposition of solid rubber results in volatile oils and/or gases, for example the volatile oils may include 4 to 7 isoprene units.

The carbon nanotubes are formed during thermally treating the intermediate material in contact with the catalyst at the second temperature. According to various embodiments, the method may further include separating the carbon nanotubes from any remaining residues of the reaction.

Figure 2:
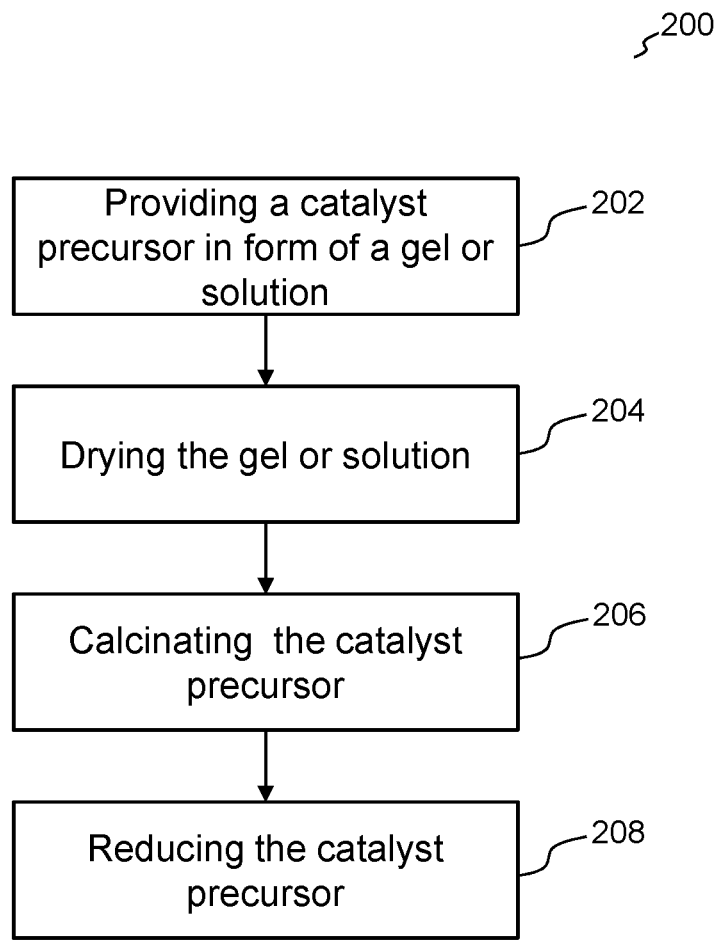
FIG. 2 shows a schematic illustrating a process 200 for forming the catalyst, in accordance with various embodiments.

FIG. 2 shows a schematic illustrating a process 200 for forming the catalyst, which process may be included the synthesis method, in accordance with various embodiments. In a process step 202 a catalyst may be provided in the form of a gel, e.g. sol-gel, or a solution. A further process step 204 may include drying the gel or solution thereby obtaining a dried material. Optionally, the dried material may be grinded. A further process step 206 may include calcinating the catalyst precursor, in other words, calcinating the dried material, or the ground dried material. A further process step 208 may include reducing the catalyst precursor thereby forming the catalyst.

According to various embodiments, the catalyst may be provided as a catalyst precursor, for example in the second location, and may further be converted to the catalyst, for example in the second location. Converting a catalyst precursor into the catalyst may include the method steps of calcinating the dried material thus obtaining a calcinated material and reducing the calcinated material, this conversion step may, for example, be carried out in the second location. Thereby, the catalyst precursor may be provided and converted in the second location, within the reactor, without requiring transportation between different locations, thus simplifying the process.

According to various embodiments, the method may further include forming the catalyst, wherein forming the catalyst may include forming a gel, e.g., with a sol-gel process, or a solution. Thus, the catalyst precursor may be provided as a gel, for example as a dried and ground gel, in at least one forming step.

According to various embodiments, at least a first component and a complexing agent may be used for forming the gel or the solution. For example the first component may be provided in the form of a first component nitrate salt. The first component may be a transition metal or mixed metals, which may be selected from: transition metals, noble metals, for example, selected from at least one of: Ni, Fe, Co. The first component nitrate salt may be selected from at least one of a nitrate salt of Ni, a nitrate salt of Fe, a nitrate salt of Co.

According to various embodiments, the complexing agent may be citric acid or another suitable agent.

In some embodiments, at least a second component in form of a second component nitrate salt may be used for forming the gel or the solution, for example in addition to the first component and the complexing agent. The second component may be selected from Al, Si, Mg, L, La, and combinations thereof. As used herein and in accordance with various embodiments, "L" may refer to refers to an element, or a combination of elements, selected from the family of lanthanides. One example of L is lanthanum (La).

According to various embodiments, the first and the second component are reacted together to form a catalyst precursor.

According to various embodiments, the second component may be transformed into an oxide, for example during calcination. The oxide may be selected from at least one of: $Al_2O_3$, $SiO_2$, MgO, $La_2O_3$. These oxides may serve as support in the catalyst.

According to various embodiments, the method may further include drying (thus obtaining a dried material), optionally grinding, and calcinating the gel or solution, thus obtaining a calcinated material. The method may further include reducing the calcinated material, for releasing the component in an elemental state as particles, e.g. metal particles, thus forming the catalyst. In some embodiments, at least one of drying, calcinating, reducing, may be carried out in the second location, without requiring removal before using the catalyst to form carbon nanotubes.

According to various embodiments, a drying temperature employed during the drying may be selected from about 60° C. to about 120° C.

According to various embodiments, a calcinating temperature employed during the calcination may be selected from about 500° C. to about 800° C. The calcinating step may be carried out in a gas comprising oxygen, for example comprising or consisting of air.

According to various embodiments, the reduction step may be carried out in presence of hydrogen gas, for example, with a flow of an inert gas mixed with $H_2$. An example of an inert gas is $N_2$.

According to various embodiments, the temperature during the reduction step may be selected from about 650° C. to about 800° C.

According to various embodiments, the catalyst may include single metal and/or mixed metal particles, which may be selected from: transition metals, noble metals, e.g. Ni or FeNi particles. The catalyst may be provided in the form of catalyst particles, for example, including more than one metal type, e.g., selected from: transition metals, noble metals. The catalyst may include a support, such as an aluminum oxide, e.g. $Al_2O_3$.

As used herein and in accordance with various embodiments, temperature(s) may refer to the temperature(s) measured at material, preferably solid or liquid, being treated. For example, the drying temperature of the natural rubber may refer to the temperature measured at the natural rubber being dried. For example, the calcinating temperature of the gel or solution may refer to the temperature measured at the dried material being calcinated. For example, the temperature of the reduction step of the catalyst may refer to the temperature measured at the catalyst precursor being reduced. For example, the second temperature (also named forming temperature) may refer to the temperature measured at the catalyst while the carbon nanotubes are being formed. For example, the temperature of the decomposition step of the natural rubber may refer to the temperature measured at the natural rubber being decomposed.

According to various embodiments, various method steps of any described method may be performed at ambient pressure, for example at about 101325 Pa.

According to various embodiments, the used catalyst may be recycled for production of fresh catalyst. Accordingly, the method according to various embodiments may include recycling the used catalyst for production of fresh catalyst.

The synthesis method may be easily adapted for adjusting the characteristics of the resulting nanotubes, for example for obtaining nanotubes with a certain diameter.

Various embodiments may provide an adjusting method for adjusting an average characteristic of resulting nanotubes produced by the synthesis method. The adjusting method may include carrying out the synthesis method as a reference method, with the second temperature as a reference second temperature, a reference reaction time, and a reference concentration of $H_2$ in the forming gas, thereby producing carbon nanotubes comprising a reference average diameter. The adjusting method may further include adjusting at least one of: the second temperature into an adjusted second temperature, the reaction time into an adjusted reaction time, the concentration of $H_2$ in the forming gas into an adjusted concentration, thereby providing adjusted synthesis parameters. The adjusting method may further include carrying out the synthesis method with the adjusted synthesis parameters, thereby producing carbon nanotubes with an adjusted average diameter.

In some embodiments, at least one of the following may be provided for producing carbon nanotubes comprising an adjusted average diameter smaller than the reference average diameter: the adjusted second temperature is lower than the reference second temperature; the adjusted reaction time is shorter than the reference reaction time; the adjusted concentration is bigger than the reference concentration. Alternatively, in some embodiments, at least one of the following may be provided for producing carbon nanotubes comprising an adjusted average diameter larger than the reference average diameter: the adjusted second temperature is higher than the reference second temperature; the adjusted reaction time is longer than the reference reaction time; the adjusted concentration is smaller than the reference concentration.

Figure 3:
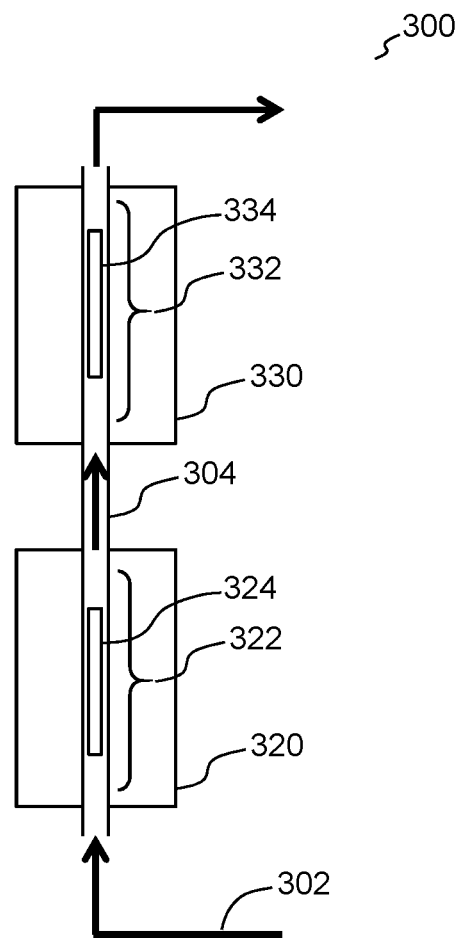
FIG. 3 shows a schematic view of an exemplary reactor 300 for carrying out at least one of: decomposing the first material, thermally treating the first material, calcinating the catalyst precursor, reducing the catalyst precursor, according to various embodiments.

FIG. 3 shows a schematic view of an exemplary reactor 300 for carrying out at least one of: decomposing the first material, thermally treating the first material, calcinating the catalyst precursor, reducing the catalyst precursor, according to various embodiments. FIG. 3 shows the reactor 300 comprising a first location 322 in which the first material may be provided, for example in a quartz reactor tube, and a second location 332 in which the catalyst may be provided or a catalyst precursor may be provided and converted into the catalyst, for example in a quartz reactor tube. For illustration purposes, in the example shown in FIG. 3 the first location 322 is shown to be included in a first furnace 320 and the second location 332 is shown to be included in a second furnace 330. Alternatively, the second location may be located in the first furnace, and for example, the first material and the catalyst may be included in a same quartz reactor tube, and a second furnace may not be necessarily required. FIG. 3 also shows a flow path 304 for a gas 302, for example the forming gas, which may flow from the first location 322 to the second location 332.

Experimental Results

Experiments were performed using a reactor as shown in FIG. 3. The quartz reactor tubes were heated individually with electrical furnaces, with temperature fully controlled and monitored. The catalyst was first reduced in upper furnace with a nitrogen/hydrogen flow and then used for catalytic reaction. The decomposition of the rubber was conducted in lower furnace, with nitrogen gas flow introduced from the bottom of the reactor. Thus, after introducing the first material and the catalyst precursor, the catalyst precursor may be converted into the catalyst and the nanotubes may be synthesized without requiring opening of the reactor.

Rubber Decomposition

Figure 4:
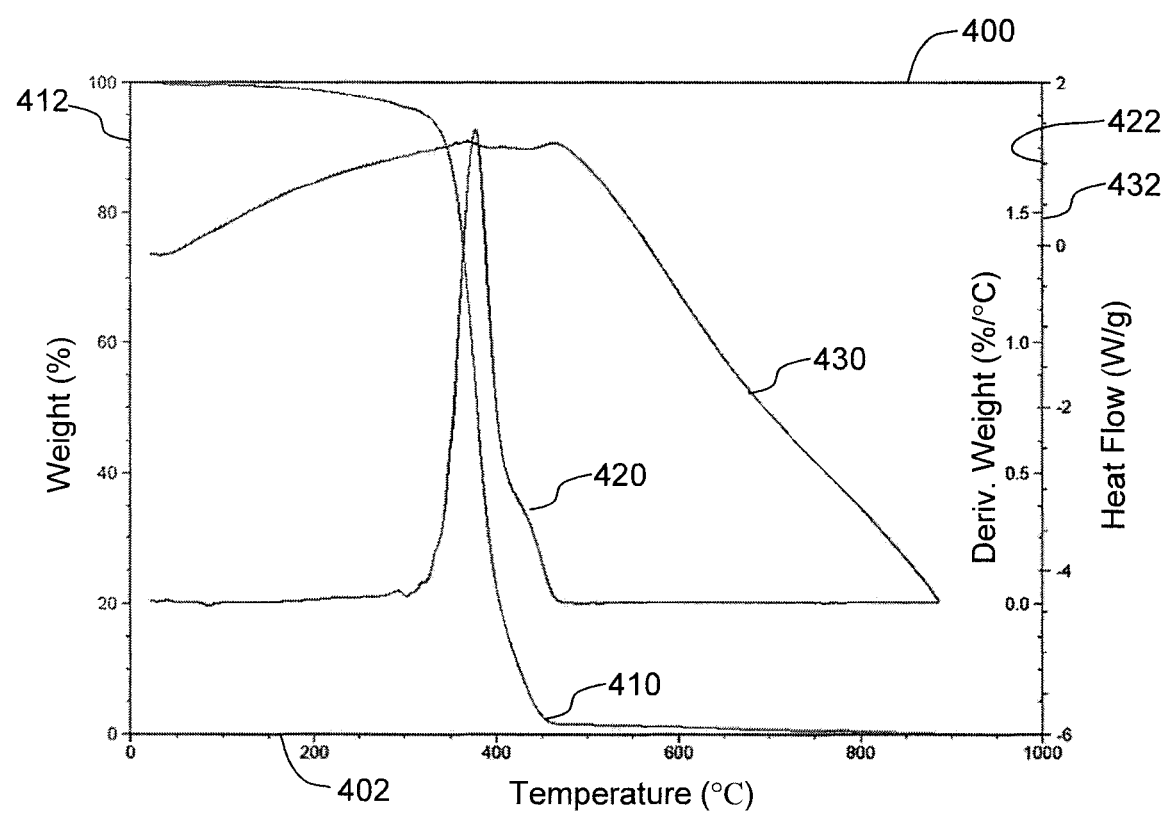
FIG. 4 shows a plot 400 with the results of a thermogravimetric analysis (TGA) of natural rubber.

FIG. 4 shows a plot 400 with the results of a thermogravimetric analysis (TGA) of natural rubber. The horizontal axis 402 represents the temperature in Celsius. The plot 410 shows the weight loss of the sample, represented at axis 412. The plot 420 shows the derivative of the plot 410, represented at axis 422. The plot 430 shows the heat flow, represented at axis 432.

The TGA results (FIG. 4) show that natural rubber starts decomposition at 200° C. and the decomposition is completed at 450° C., with less than 2 weight % left. A single weight loss peak is observed between 350-450° C., indicating that the rubber decomposition is a one-stage reaction. As shown, thermal decomposition is a suitable route for degradation of solid polyisoprene into small molecules, as it is simple and does not need complicated procedures and expensive equipment. Thus, any natural rubber containing polyisoprene may be used for the production of carbon nanotubes.

Catalyst Preparation

Ni—$Al_2O_3$ catalyst was prepared by citric acid complexing method with Ni loading ranging from greater than 5 mol % to 30 mol % as described above. Typically, nickel(II)) nitrate hexahydrate (11.6 g, 0.04 mol), aluminum nitrate monohydrate (67.0 g, 0.18 mol) and citric acid (46.0 g, 0.24 mol) were dissolved in 200 mL deionized water. The solution was placed into an oven and maintained at 85° C. until a sticky gel was formed. The oven temperature was then increased to 130° C. and heated until completely dried. The dried mixture was grinded carefully and calcinated at 400° C. for 1 h, and then at 700° C. for 5 h using a ramping rate of 1.5° C./min.

Figure 5:
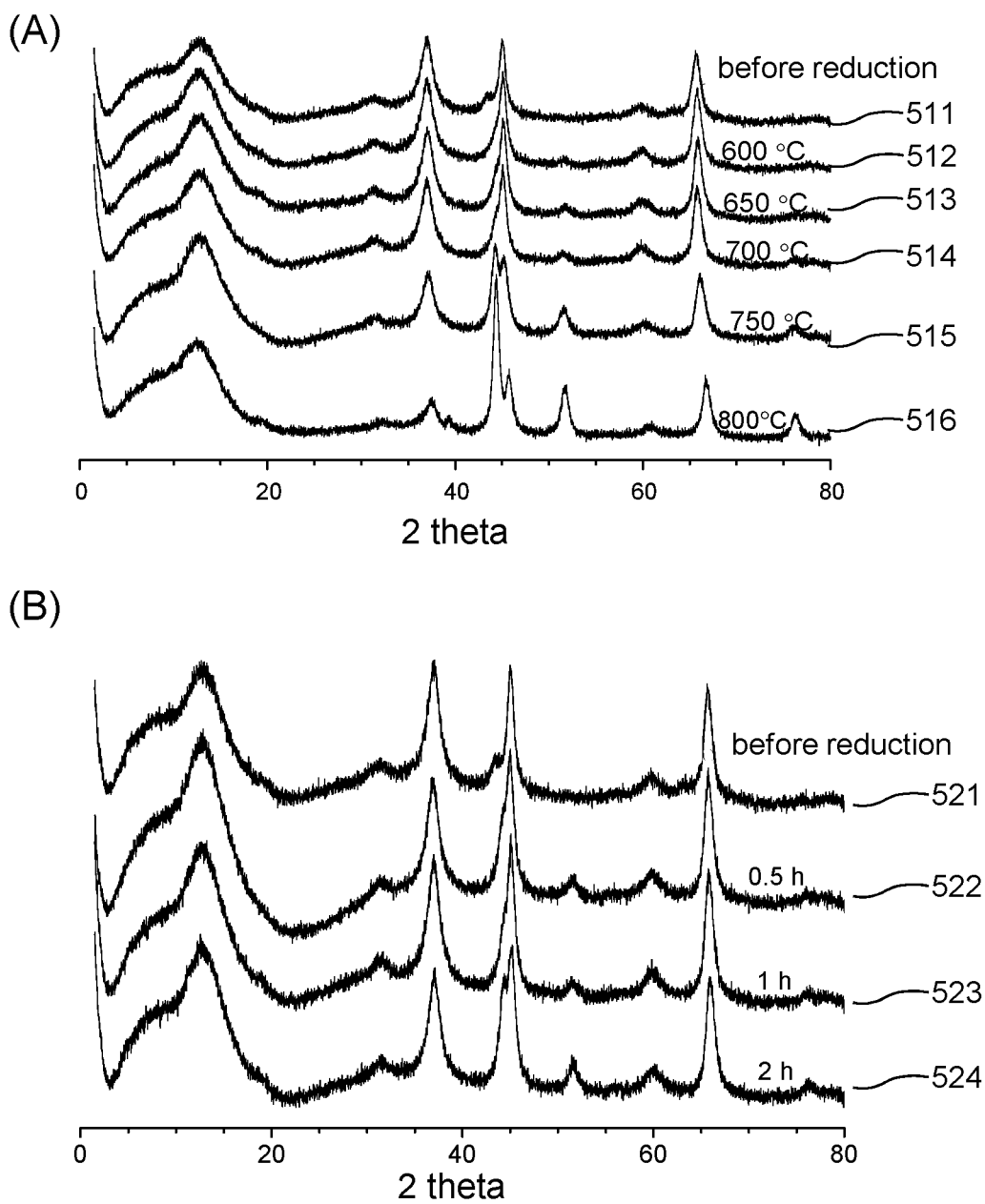
FIG. 5 shows X-ray diffraction (XRD) plots for various samples of catalyst in bulk form and after different reduction times and temperatures in accordance with various embodiments.

FIG. 5 shows X-ray diffraction (XRD) plots for various samples of bulk catalyst. FIG. 5(A) shows the XRD patterns for the bulk catalyst before reduction (catalyst precursor) in plot 511, after reduction at 600° C. (plot 512), after reduction at 650° C. (plot 513), after reduction at 700° C. (plot 514), after reduction at 750° C. (plot 515), and after reduction at 800° C. (plot 516). The plots in FIG. 5(A) are vertically offset for enhancing visualization. FIG. 5(B) shows the XRD patterns for the bulk catalyst at different times during reduction. Plot 521 shows the XRD patterns for the bulk catalyst before reduction (catalyst precursor), plot 522 is after 0.5 h, plot 523 after 1 h and plot 524 after 2 h.

The XRD patterns reveal the structural information of the bulk catalyst after reduction. After calcination of catalysts, $NiAl_2O_4$ (spinel) phase was formed first in air treatment. During reduction by hydrogen, the Ni element can be reduced and separated out of the $NiAl_2O_4$ phase to form Ni nanoparticles on $Al_2O_3/NiAl_2O_4$ surfaces. These freshly formed Ni nanoparticles are the active component for the CNTs growth. In XRD patterns, three major peaks at 44.4°, 51.5° and 76° can be assigned to metallic Ni. The peak intensity becomes higher with increasing reduction temperature and time, indicating more Ni is separated out of the $NiAl_2O_4$ phase. Moreover, the full width at half maximum of the peaks becomes narrower, meaning the Ni particle size increases at high temperature or longer reduction time. In general, the average Ni particle size increases with increase of the reduction temperature or time. Suitable catalyst may have a particle size of about 7 nm for the growth of CNTs with low amount of amorphous carbon spheres.

Figure 6:
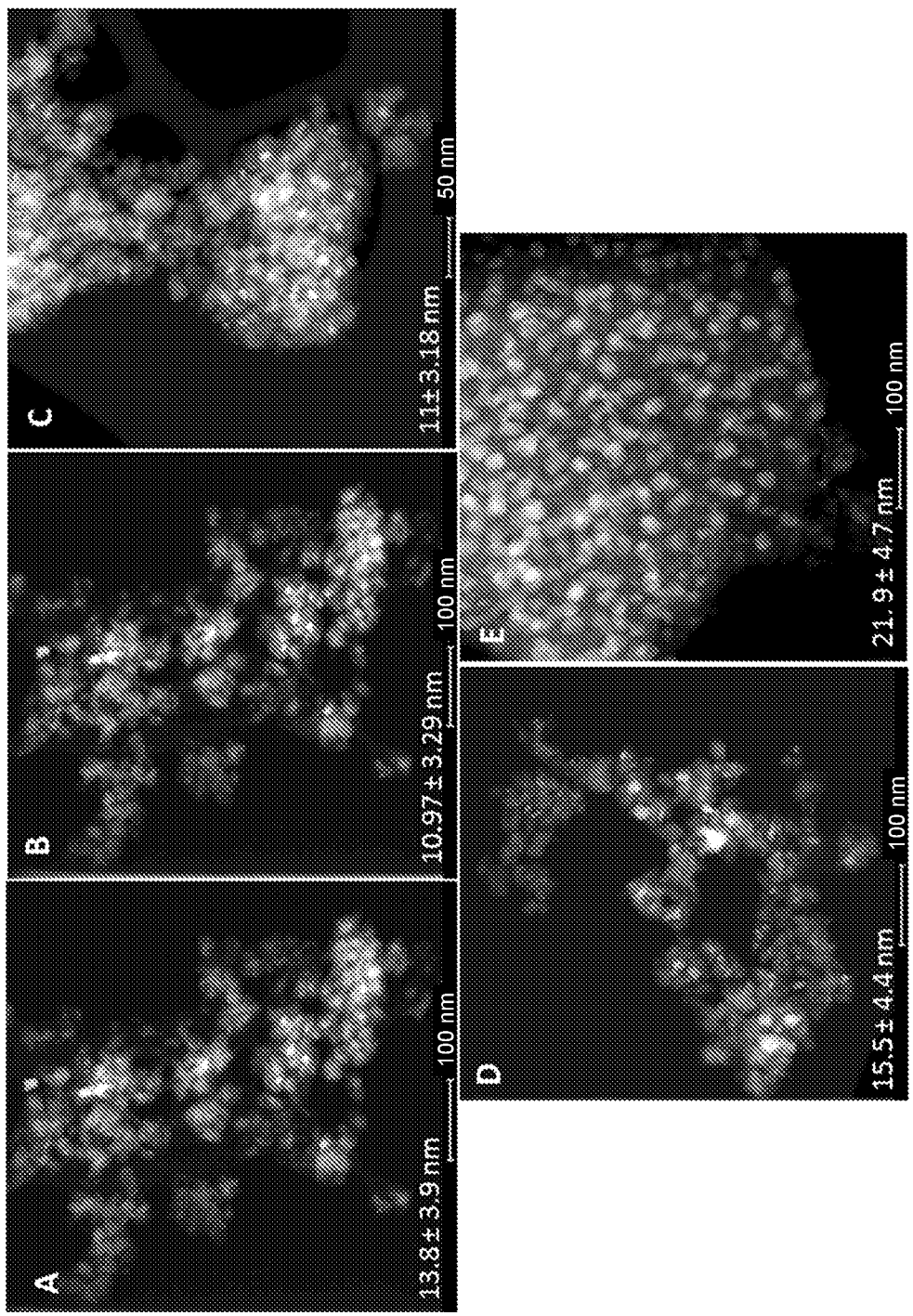
FIG. 6 shows transmission electron microscopy (TEM) images for various samples of catalyst reduced at different temperatures in accordance with various embodiments.
Figure 7:
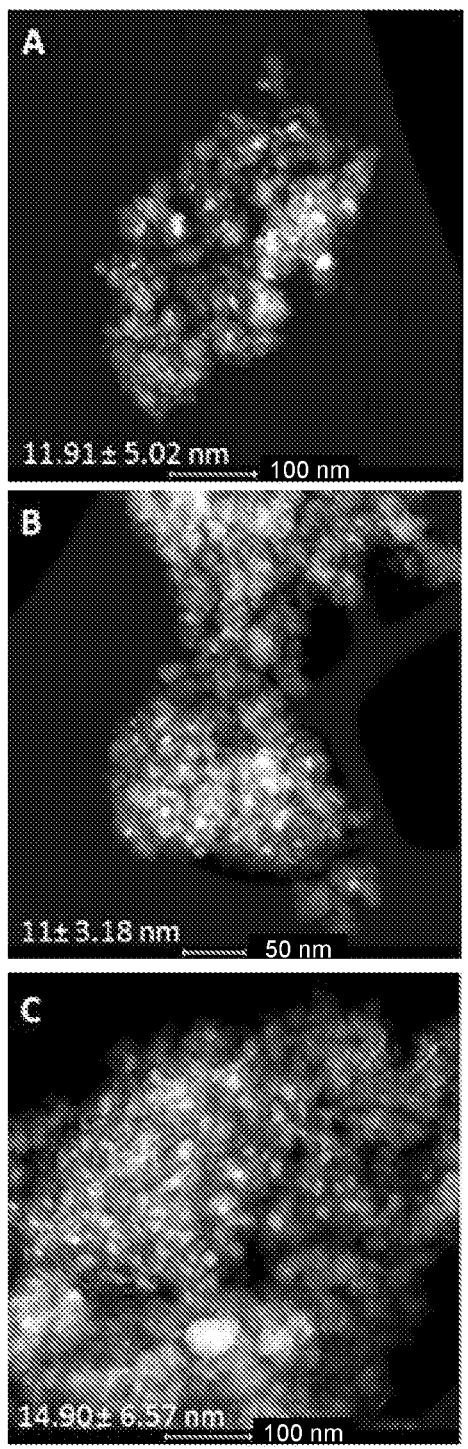
FIG. 7 shows transmission electron microscopy (TEM) images for various samples of catalyst after different reduction times in accordance with various embodiments.

The same samples were characterized by TEM. The TEM images of the Ni-based catalyst with various reduction temperature and time are shown in FIGS. 6 and 7, respectively. FIG. 6 shows a sample A reduced at 600° C., a sample B reduced at 650° C., a sample C reduced at 700° C., a sample D reduced at 750° C. and a sample E reduced at 800° C. These samples of FIG. 6 correspond to the XRD plots of FIG. 5(A).

FIG. 7 shows a sample A after 0.5 h reduction time, sample B after 1 h reduction time and sample C after 1.5 h reduction time. These samples of FIG. 7 correspond to the XRD plots of FIG. 5(B).

The white dots indicate the presence of the Ni active particles, and gray large particles are $Al_2O_3$ or $NiAl_2O_4$ substrate. These TEM images show that the Ni particles are relatively uniform in size within each sample. Similarly to the XRD results, there is a general trend of increase in the particle size with increasing temperature or prolonging the reduction time.

Growth of Carbon Nanotubes

The conversion rate of rubber into carbon nanotubes and yield of carbon nanotube per g of catalyst were measured with excess of catalyst. Experimental results show that a high amount, for example from about 40% to about 60%, rubber can be converted into multi-walled carbon nanotubes. The calculated $I_G/I_D$ ($I_G$ is the Raman signal intensity of the G band and $I_D$ is the Raman signal intensity of the D band) values from Raman spectra are similar to carbon nanotubes grown from fossil oil precursors, indicating a similar quality of the CNTs with few defects.

In the following, 3 examples will be described for CNT growth using natural rubber as first material in accordance with various embodiments.

Figure 8:
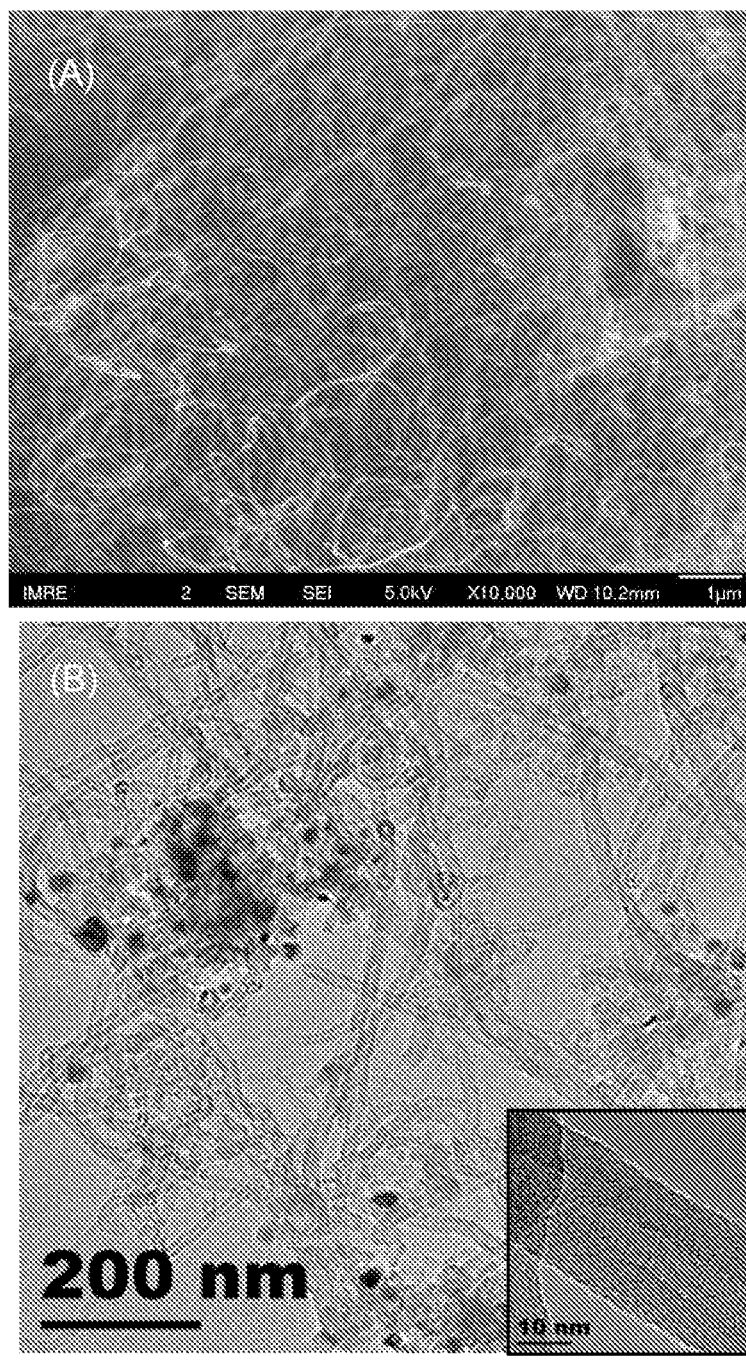
FIG. 8 shows a scanning electron microscopy (SEM) image and a TEM image of CNTs obtained in a first example in accordance with various embodiments.

Example 1: 1 g of dried natural rubber was provided as first material in the first location. 0.5 g of dried, ground and calcinated catalyst (calcinated material) was provided in the second location. The calcinated material was produced as described above. The catalyst was formed by reduction at the temperature of 775° C. under $N_2/H_2$ flow (20:10 mL/min) for 1 h. After forming the catalyst, the first material was thermally decomposed at the first temperature of 400° C. into the intermediate material which was carried to the second location to contact the catalyst. The intermediate material was thermally treated at the second temperature of 700° C. under $N_2/H_2$ flow (20:10 mL/min) for 1 h. 0.20 g multi-walled carbon nanotubes were obtained. The average outer diameter of the carbon nanotubes produced is 20.9 nm, with a wall thickness of about 7.7 nm. The typical images of obtained carbon nanotubes are shown in the SEM image of FIG. 8(A) and in the TEM image of FIG. 8(B).

Figure 9:
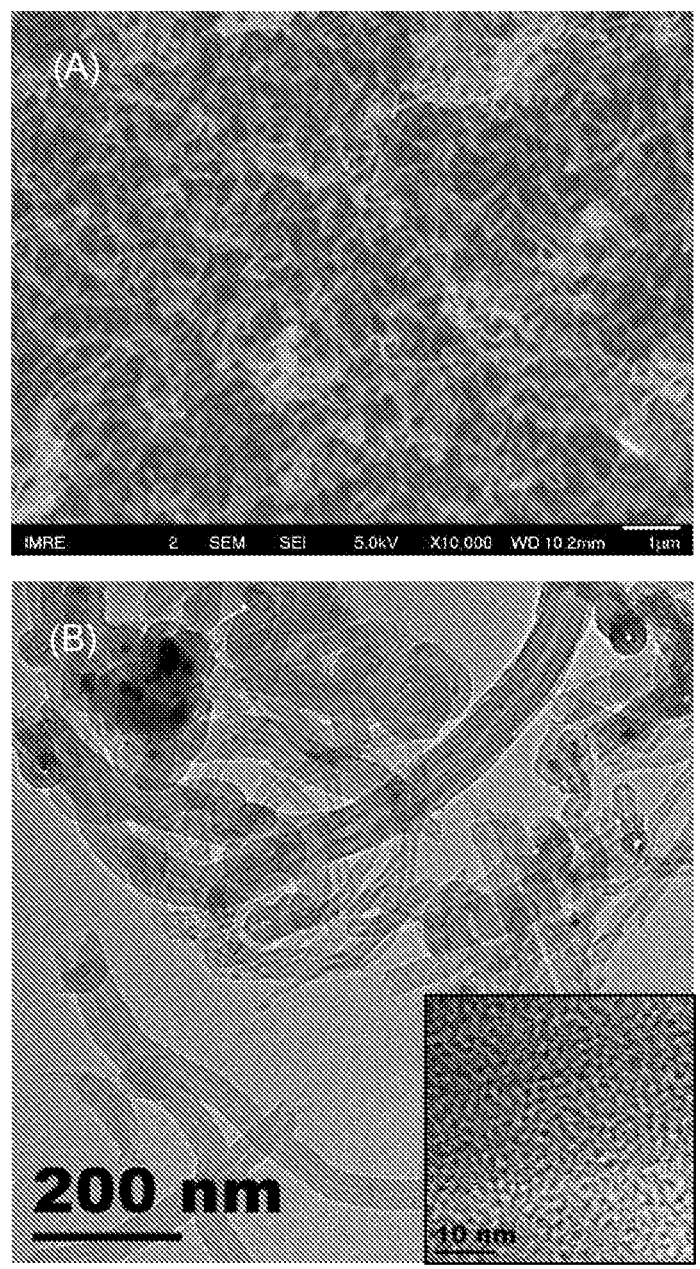
FIG. 9 shows a scanning electron microscopy (SEM) image and a TEM image of CNTs obtained in a second example in accordance with various embodiments.

Example 2: a second experiment was carried out as in Example 1, except that the second temperature was 750° C. under $N_2$ flow (20 mL/min) for 1 h. 0.15 g multi-walled carbon nanotubes were obtained. The average outer diameter of the carbon nanotubes produced is 25.1 nm, with a wall thickness of about 9.3 nm. The typical images of obtained carbon nanotubes are shown in the SEM image of FIG. 9(A) and in the TEM image of FIG. 9(B).

Figure 10:
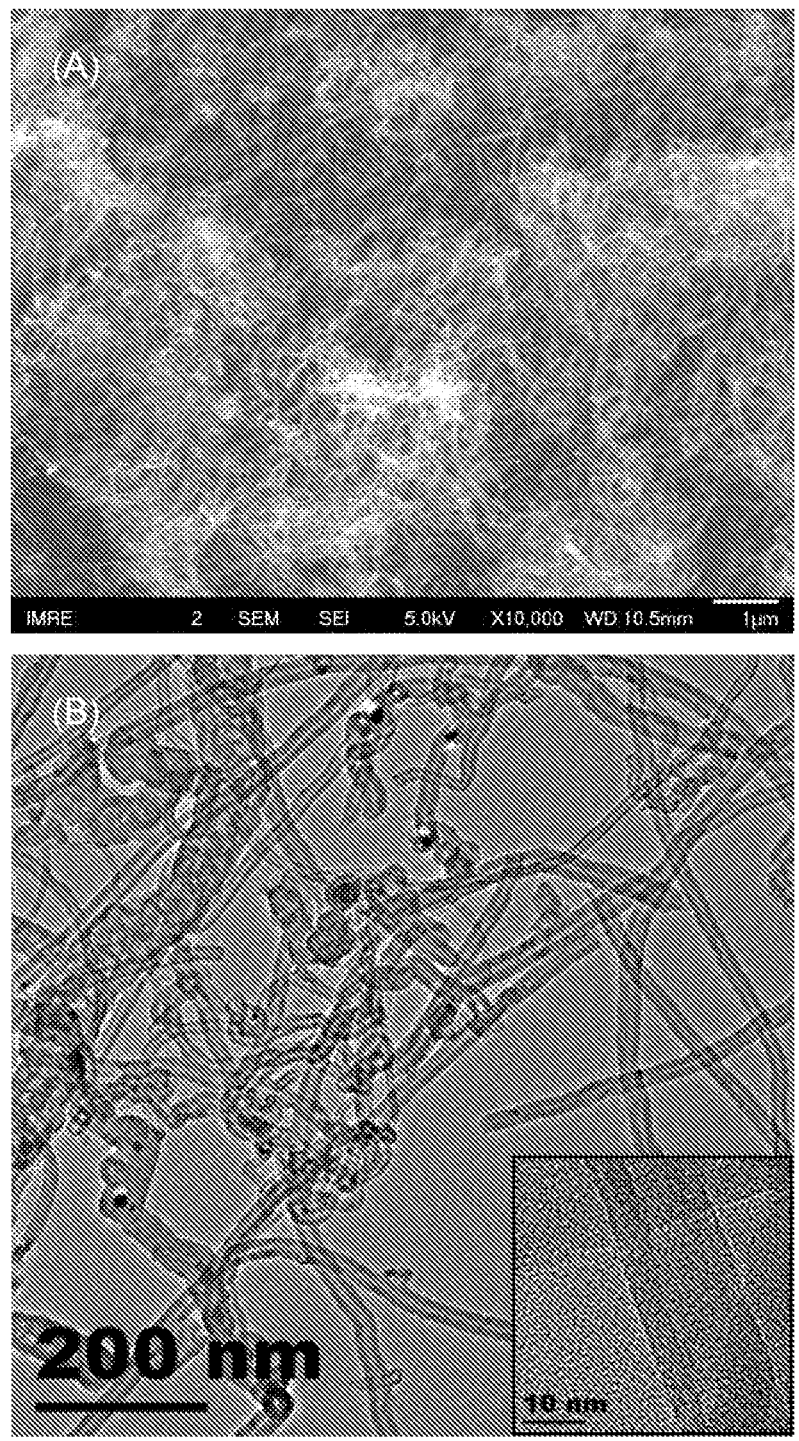
FIG. 10 shows a scanning electron microscopy (SEM) image and a TEM image of CNTs obtained in a third example in accordance with various embodiments.

Example 3: a third experiment was carried out as in Example 2, except that the second temperature was 700° C. 0.13 g multi-walled carbon nanotubes were obtained. The average outer diameter of the carbon nanotubes produced is 25.6 nm, with a wall thickness of about 7.7 nm. The typical images of obtained carbon nanotubes are shown in the SEM image of FIG. 10(A) and in the TEM image of FIG. 10(B).

Using the synthesis method in accordance with various embodiments, natural rubber or its derivatives may be thermally decomposed at high temperatures, and then restructured on metal-based catalyst to form carbon nanotubes. It was shown that high yields, for example, 40-60% of the rubber can be converted into multi-walled carbon nanotubes with a narrow diameter distribution. The diameter and wall thickness of carbon nanotubes can be tuned by varying the synthesis conditions.

The invention claimed is:

1. A method for synthesis of carbon nanotubes from natural rubber, comprising:
    providing a first material including a natural rubber or derivatives thereof;
    thermally decomposing the first material at a first temperature into an intermediate material, wherein the first temperature is selected from about 200° C. to about 500° C.;
    contacting the intermediate material with a catalyst; and
    thermally treating the intermediate material in contact with the catalyst at a second temperature, for forming carbon nanotubes,
    wherein the first material comprises less than 10 weight % of vulcanized rubber, or wherein the first material comprises less than 10 weight % of vulcanized rubber and wherein the natural rubber is one or more of latex and coagulated latex.

2. The method according to claim 1, wherein the step of thermally decomposing the first material is carried out in a first location, and wherein the first location is in a first furnace or in a section of the first furnace.

3. The method according to claim 2, wherein the step of thermally treating the intermediate material is carried out in a second location, and wherein the second location is selected from: a second furnace or a second section of the first furnace.

4. The method according to claim 3, wherein at least one of the steps of (i) thermally decomposing the first material and (ii) thermally treating the intermediate material, is carried out under a forming gas, wherein the forming gas is provided as a gas flow.

5. The method according to claim 4, wherein the gas flow is from the first location to the second location, thereby being able to transport the intermediate material from the first location to the second location.

6. The method according to claim 3, wherein the catalyst is provided as a catalyst precursor in the second location, and converted to the catalyst in the second location.

7. The method according to claim 1, wherein the second temperature is selected from about 600° C. to about 800° C.

8. The method according to claim 1, further comprising separating the carbon nanotubes from remaining residues of the thermal treatment of the intermediate material.

9. The method according to claim 1, further comprising at least one of:
    recycling the catalyst after thermally treating the intermediate material, for production of fresh catalyst; and
    forming the catalyst, wherein the method of forming the catalyst includes forming a solution or a gel.

10. The method according to claim 9, comprising at least forming the catalyst, wherein the method of forming the catalyst includes forming a solution or a gel, wherein at least a first component in form of a first component nitrate salt and a complexing agent is used for forming the solution or the gel.

11. The method according to claim 10, wherein the first component is a transition metal and/or mixed metals being selected from: transition metals, and noble metals.

12. The method according to claim 11, further comprising:
    drying and calcinating the solution or the gel, thus obtaining a calcinated material; and
    reducing the calcinated material, for releasing the first component in an elemental state as particles.

13. The method according to claim 10, wherein at least a second component in form of a second component nitrate salt is used for forming the solution or the gel; or wherein at least a second component in form of a second component nitrate salt is used for forming the solution or the gel, the second component being selected from: Al, Si, Mg, La, and combinations thereof.

14. The method according to claim 13, further comprising:
    drying and calcinating the solution or the gel, thus obtaining a calcinated material; and reducing the calcinated material, for releasing the first component in an elemental state as particles, wherein the second component is transformed into an oxide during calcination.

15. The method according to claim 14, wherein a calcinating temperature employed during the calcination is selected from 500° C. to 800° C.

16. The method according to claim 14, wherein the reduction step is carried out in presence of hydrogen gas.

17. The method according to claim 14, wherein a temperature during the reduction step is from 650° C. to 800° C.

18. An adjusting method for adjusting an average characteristic of resulting carbon nanotubes produced by the method according to claim 1, comprising:
  carrying out the method as a reference method thereby producing carbon nanotubes comprising a reference average diameter, and
  for decreasing the average diameter of the carbon nanotubes: decreasing the second temperature and/or decreasing a reaction time and/or increasing a concentration of $H_2$ in the forming gas in relation to the reference method; or
  for increasing the average diameter of the carbon nanotubes: increasing the second temperature and/or increasing a reaction time and/or decreasing a concentration of $H_2$ in the forming gas in relation to the reference method.

* * * * *